(12) United States Patent
Lee et al.

(10) Patent No.: US 12,099,798 B2
(45) Date of Patent: Sep. 24, 2024

(54) METHOD AND APPARATUS FOR TRANSFORMING DOCUMENT OF EACH OF PLURALITY OF FILE FORMATS

(71) Applicant: TmaxOffice Co., Ltd, Gyeonggi-Do (KR)

(72) Inventors: Junhee Lee, Gyeonggi-Do (KR); Moon Namkoong, Gyeonggi-Do (KR); Yujin Lim, Seoul (KR); Bongyong Kwon, Gyeonggi-Do (KR); Seungjae Lee, Gyeonggi-Do (KR); Seungjoon Yang, Gyeonggi-Do (KR); Jinkyeong Kim, Gyeonggi-Do (KR); Jaehyeok Son, Gyeonggi-Do (KR); Jeongho Lee, Gyeonggi-Do (KR); Sangjin Ha, Gyeonggi-Do (KR); Soungho Cho, Gyeonggi-Do (KR); Sanghoon Han, Gyeonggi-Do (KR)

(73) Assignee: TmaxGAIA Co., Ltd., Gyeonggi-Do (KR)

( * ) Notice: Subject to any disclaimer, the term of this patent is extended or adjusted under 35 U.S.C. 154(b) by 0 days.

(21) Appl. No.: 18/196,289

(22) Filed: May 11, 2023

(65) Prior Publication Data
US 2024/0289534 A1 Aug. 29, 2024

(30) Foreign Application Priority Data
Feb. 27, 2023 (KR) ........................ 10-2023-0025688

(51) Int. Cl.
*G06F 16/11* (2019.01)
*G06F 40/137* (2020.01)

(52) U.S. Cl.
CPC .......... *G06F 40/137* (2020.01); *G06F 16/116* (2019.01)

(58) Field of Classification Search
CPC ...... G06F 40/137; G06F 40/14; G06F 40/151; G06F 40/154; G06F 16/116; G06F 16/13
See application file for complete search history.

(56) References Cited

U.S. PATENT DOCUMENTS 11,068,646 B2   7/2021  Argyros et al.
2006/0007464 A1* 1/2006  Percey .................. G06F 40/143
                                                  358/1.13

(Continued)

FOREIGN PATENT DOCUMENTS

KR      10-1245337 B1      3/2013
KR   10-2021-0040850 A      4/2021

OTHER PUBLICATIONS

Andreas Unterweger et al., A Generic Model for Universal Data Storage and Conversion, Dec. 1, 2011, IEEE Jordan Conference on Applied Electrical Engineering and Computing Technologies, pp. 1-6 (Year: 2011).*

(Continued)

*Primary Examiner* — Tam T Tran
(74) *Attorney, Agent, or Firm* — Harris Beach PLLC

(57) ABSTRACT

According to an exemplary embodiment of the present disclosure, a method for transforming a document with each of a plurality of file formats, performed by a computing device includes receiving a request for transforming a document with each of a plurality file formats into application model data having a structure or format which is available for an application for loading and storing the document; generating intermediate hierarchical data between the document with each of the plurality of file formats and the application model data, using the document with each of the plurality of file formats, in response to the received request; and transforming intermediate hierarchical data generated corresponding to each of the plurality of file formats into (Continued)

application model data corresponding to each of the plurality of file formats.

13 Claims, 10 Drawing Sheets

(56) References Cited

U.S. PATENT DOCUMENTS

| | | | |
|---|---|---|---|
| 2006/0007466 A1* | 1/2006 | Ben-Yehuda | G06F 40/154 |
| | | | 358/1.13 |
| 2008/0028048 A1* | 1/2008 | Shekar Cs | H04L 41/0856 |
| | | | 709/223 |
| 2021/0312125 A1 | 10/2021 | Zhang et al. | |
| 2022/0309226 A1 | 9/2022 | D'Oria et al. | |

OTHER PUBLICATIONS

Guangpeng Ji et al., Research and Implementation of Key Technologies for Transforming Formatted Data into Natural Language Text, International Conference on Computers, Information Processing and Advanced Education, Oct. 1, 2020, pp. 238=242 (Year: 2020).*

* cited by examiner

METHOD AND APPARATUS FOR TRANSFORMING DOCUMENT OF EACH OF PLURALITY OF FILE FORMATS

CROSS-REFERENCE TO RELATED APPLICATIONS

This application claims priority to Korean Application No 10-2023-0025688 filed on Feb. 27, 2023, which is incorporated herein by reference in its entirety.

TECHNICAL FIELD

The present disclosure relates to a method and apparatus for transforming a document with each of a plurality of file formats.

BACKGROUND

Generally, in order for one application to load and store documents with various file formats, modules which perform document export/import functions for every file format are separately developed and a document of each file format is transformed into data of a structure or a format which is available for the application using a module developed in response to each file format to perform a storing and/or loading operation.

However, each of the modules developed as described above has a high dependency on the application so that whenever data stored by the application is modified, it is inconvenient to modify each of the modules for each file format to be compatible with the application.

Accordingly, a method and an apparatus for transforming a document with each of the plurality of file formats are required to minimize the dependency on the application by merging at least some of modules implemented for every file format.

SUMMARY

The present disclosure has been made in response to the above-described background and provides a method and an apparatus for transforming a document with each of a plurality of file formats.

Technical objects of the present disclosure are not limited to the aforementioned technical objects and other technical objects which are not mentioned will be apparently appreciated by those skilled art from the following description.

In order to solve the foregoing object, an exemplary embodiment of the present disclosure discloses a document transforming method for transforming a document with each of a plurality of file formats, performed by a computing device. The document transforming method comprises: receiving a request for transforming a document with each of the plurality file formats into application model data having a structure or format which is available for an application for loading and storing the document, generating intermediate hierarchical data between the document with each of the plurality of file formats and the application model data, using the document with each of the plurality of file formats, in response to the received request; and transforming intermediate hierarchical data generated corresponding to each of the plurality of file formats into application model data corresponding to each of the plurality of file formats.

Alternatively, wherein the document transforming method further comprises, storing unique identification information for the document with each of the plurality of file formats and the application model data generated corresponding to the document with each of the plurality of file formats in a data structure method, so as to correspond to each other.

Alternatively, wherein the generating of the intermediate hierarchical data, using the document with each of the plurality of file formats is transforming the document into intermediate hierarchical data corresponding to each document, using a transformation module corresponding to each of the plurality of file formats. Wherein the transformation module corresponding to each of the plurality of file formats is a module for transforming the document with each of the plurality of file formats into intermediate hierarchical data corresponding to each document.

Alternatively, wherein the transforming of the document into intermediate hierarchical data corresponding to each document, using a transformation module corresponding to each of the plurality of file formats includes: extracting a document content included in each document by parsing the document with each of the plurality of file formats, dividing the document content extracted corresponding to each document into at least one entity, generating intermediate hierarchical data for every entity having a predetermined format or structure by transforming the document content which is divided for every entity corresponding to each document, and storing the intermediate hierarchical data for every entity generated corresponding to each document, for every entity.

Alternatively, wherein at least one entity includes at least one of a text, a figure, a table, a formula, or an image.

Alternatively, wherein the transforming of the document content into intermediate hierarchical data which is divided for every entity corresponding to each document with each of the plurality of file formats is transforming the document content for every entity having different expression formats for every file format into intermediate hierarchical data for every entity having one same expression format.

Alternatively, the document transforming method further comprises storing the intermediate hierarchical data for every entity corresponding to each document in an intermediate hierarchical module including a container for every entity corresponding to each of at least one entity.

Alternatively, wherein the transforming of intermediate hierarchical data generated corresponding to each of the plurality of file formats into application model data corresponding to each of the plurality of file formats is transforming the intermediate hierarchical data into application model data using a first builder for transforming the intermediate hierarchical data into the application model data.

Alternatively, wherein the transforming of the intermediate hierarchical data into application model data using the builder includes: transforming the intermediate hierarchical data into at least one document object formed by a language understandable in the application by analyzing the intermediate hierarchical data for every entity, and generating the application model data including at least one document object, attribute information of each document object, and relational information representing a relationship between document objects.

Alternatively, the document transforming method further comprises: receiving a request for loading a document of a first file format, acquiring application model data corresponding to the document of the first file format, among previously stored document model data, determining whether the acquired application model data is modified, modifying a second builder for transforming the application model data into intermediate hierarchical data corresponding to the document of the first file format to be compatible with the acquired application model data when the acquired application model data is modified, transforming the acquired application model data into intermediate hierarchical data corresponding to a document of the first file format, using the modified second builder, and transforming the intermediate hierarchical data corresponding to the document of the first file format into the document of the first file format.

Alternatively, wherein the transforming of the intermediate hierarchical data corresponding to the document of the first file format into the first document is transforming the intermediate hierarchical data corresponding to the document of the first file format into the document of the first file format using a transformation module corresponding to the first file format, and wherein the transformation module corresponding to the first file format is a module for transforming the intermediate hierarchical data corresponding to the document of the first file format into the document of the first file format.

Alternatively, the document transforming method further comprises: transforming the acquired application model data into intermediate hierarchical data corresponding to the document of the first file format using the second builder when the acquired application model data is not modified, and transforming the intermediate hierarchical data corresponding to the document of the first file format into the document of the first file format.

Alternatively, a computer program stored in a computer readable storage medium is discloses. When the computer program is executed by one or more processors to perform the following operations to transform a document with each of a plurality of file formats. The operations comprises: receiving a request for transforming a document with each of the plurality file formats into application model data having a structure or format which is available for an application for loading and storing the document, generating intermediate hierarchical data between the document with each of the plurality of file formats and the application model data, using the document with each of the plurality of file formats, in response to the received request, and transforming intermediate hierarchical data generated corresponding to each of the plurality of file formats into application model data corresponding to each of the plurality of file formats.

Alternatively, a computing device for transforming a document with each of a plurality of file formats is discloses. The computing device comprises at least one processor, and a memory. Wherein the at least one processor is configured to receive a request for transforming a document with each of the plurality file formats into application model data having a structure or format which is available for an application for loading and storing the document, generate intermediate hierarchical data between the document with each of the plurality of file formats and the application model data, using the document with each of the plurality of file formats, in response to the received request, and transform intermediate hierarchical data generated corresponding to each of the plurality of file formats into application model data corresponding to each of the plurality of file formats.

The technical solutions which can be obtained in the present disclosure are not limited to the aforementioned technical solutions and other unmentioned technical solutions will be clearly understood by those skilled in the art from the following description.

According to some exemplary embodiments of the present disclosure, in the present disclosure, modules for transforming documents of different file formats into intermediate hierarchical data having one same representation structure and modules for transforming the intermediate hierarchical data into application model data which is available for the application are separately implemented to minimize the dependency on the application.

According to the present disclosure, even though application model data is modified by the application, only the modules for transforming the intermediate hierarchical data into the application model data are modified so that the inconvenience of modifying all the implemented modules is reduced and resources consumed for modification are minimized.

Effects to be achieved in the present disclosure are not limited to the aforementioned effects, and another not-mentioned effects will be obviously understood by those skilled in the art from the description below.

BRIEF DESCRIPTION OF THE DRAWINGS

Various aspects are described with reference to the drawings. Herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

DETAILED DESCRIPTION

Figure 1:
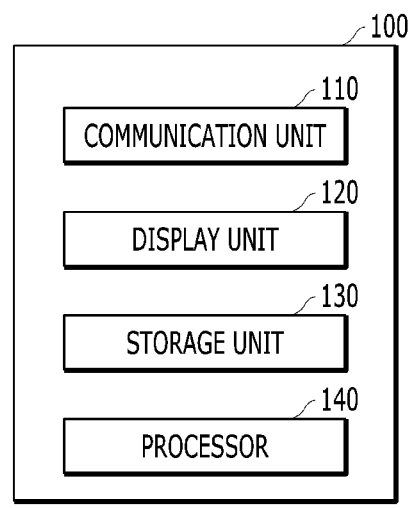
FIG. 1 is a configuration diagram of an exemplary computing device for transforming a document of each of plurality of file formats according to an exemplary embodiment of the present disclosure.

Various exemplary embodiments are described with reference to the drawings. In the present specification, various descriptions are presented for understanding the present disclosure. However, it is obvious that the exemplary embodiments may be carried out even without a particular description.

Terms, "component", "module", "unit", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include/comprise" and/or "including/comprising" shall be understood as meaning that a corresponding characteristic and/or a constituent element exists. Further, it shall be understood that a term "include" and/or "including" means that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, such implementation decisions should not be interpreted as causing a departure from the scope of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, "application" refers to all applications for loading and storing a document with each of a plurality of file formats.

FIG. 1 is a block diagram of a computing device for transforming a document with each of a plurality of file formats according to an exemplary embodiment of the present disclosure.

Referring to FIG. 1, the computing device 100 includes an arbitrary type of computer system or computer device for transforming a document with each of a plurality of file formats, such as, a digital processor, a portable device, and a device controller.

The computing device 100 according to the exemplary embodiment of the present disclosure includes a communication unit 110, a display unit 120, a storage unit 130, and a processor 140. However, the above-mentioned components are not essential for implementing the computing device 100 so that the computing device 100 may include more components or less components than the above-described components. Here, each component may be configured by a separate chip, module, or device and may be included in one device.

The communication unit 110 according to the exemplary embodiment of the present disclosure includes an arbitrary type of wired/wireless internet module for network access and connects the computing device 100 to communicate with an external device. In the proposed exemplary embodiment, the communication unit 110 uses various types of known wired networks and wireless networks.

According to some exemplary embodiments of the present disclosure, the communication unit 110 connects the computing device 100 to communicate with an external device.

According to the exemplary embodiment of the present disclosure, the display unit 120 displays various contents to a user. According to some exemplary embodiments of the present disclosure, the display unit 120 displays various interface screens for inserting a multimedia file into a document and loading a document including a multimedia file. According to various embodiments, the display unit 120 may include a touch screen and for example, may receive touch, gesture, proximity, drag, swipe, or hovering input using an electronic pen or a part (for example, a finger) of a body of the user.

According to the exemplary embodiment of the present disclosure, the storage unit 130 stores an arbitrary type of information which is generated or determined by the processor 140 and an arbitrary type of information received by the communication unit 110. According to some exemplary embodiments of the present disclosure, the storage unit 130 stores various data used to transform a document with each of a plurality of file formats.

The storage unit 130 may include a memory and/or a permanent storage medium. The storage unit 130 may include at least one type of storage medium of flash memory type, hard disk type, multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The computing device 100 may operate in association with a web storage which performs a storage function of the storage unit 130 on the Internet. The description about the above-described storage unit is just illustrative, but the present disclosure is not limited thereto.

The processor 140 generally processes the overall operation of the computing device 100. The processor 140 may process a signal, data, or information which is input or output through the above-described components or drives the application programs stored in the storage unit 130 to provide or process appropriate information or functions to the user.

The processor 140 may be configured by one or more cores and may include an arbitrary type of processor which executes instructions stored on the memory, such as a central processing unit (CPU), a general purpose graphics processing unit (GPGPU), and a tensor processing unit (TPU) of a computing device 100. The processor 140 reads a computer program stored in the storage unit 130 to perform an operation for transforming a document with each of the plurality of file formats according to some exemplary embodiments of the present disclosure.

Specifically, in response to the request, the processor 140 transforms a document with each of the plurality of file formats configured by different expression methods into intermediate hierarchical data having one predetermined expression method. Here, the plurality of file formats includes a document file format, such as doc, docx, hwp, pdf, txt, pptx, and/or xml, but is not limited thereto. In order to transform each document into intermediate hierarchical data, the processor 140 uses a transformation module corresponding to different file formats. Each transformation module corresponds to each of different file formats and performs transformation between a document of each corresponding file format and intermediate hierarchical data having one expression format. For example, the processor 140 uses a transformation module for transforming a document of a first file format into intermediate hierarchical data corresponding to a first file format, such as docx and a transformation module for transforming the intermediate hierarchical data into a document of the first file format, but is not limited thereto. In an exemplary embodiment, the expression "a document with each of a plurality of file formats" can be considered and interpreted as "a document corresponding one of a plurality of file formats" or "documents corresponding to each of a plurality of file formats where a document corresponds to a file format."

Next, the processor 140 may transform the intermediate hierarchical data having one predetermined expression method into application model data having a format or a structure which is available for the application which is capable of loading and storing a document, and store and manage the application model data. Here, the application model data may include a document object having a format or a structure which is available for the application each corresponding to at least one document content which configures each document, structure information representing a hierarchical structure between document objects, and attribute information for each document object.

In order to transform the intermediate hierarchical data into application model data, the processor 140 uses a transformation module (or builder) for transforming between the intermediate hierarchical data and application model data.

The document with each of the plurality of file formats has different expression for each document content which configures a document according to a file format, so that when specific application model data is modified, there is difficulty in modifying all the transformation modules corresponding to all the file formats for the application. In other words, transformation modules of all the document formats need to be performed on specific application model data so that when the application model data is modified, an amount of resources to be modified together is increased.

Therefore, in the present application, each document having different expression format is transformed into intermediate hierarchical data having one same expression format and the intermediate hierarchical data is transformed into the application model data to be stored and managed.

As described above, modules for transforming a document with each of different file formats into intermediate hierarchical data and modules for transforming the intermediate hierarchical data into application model data are separately implemented so that the dependency on the application may be minimized.

Figure 2:
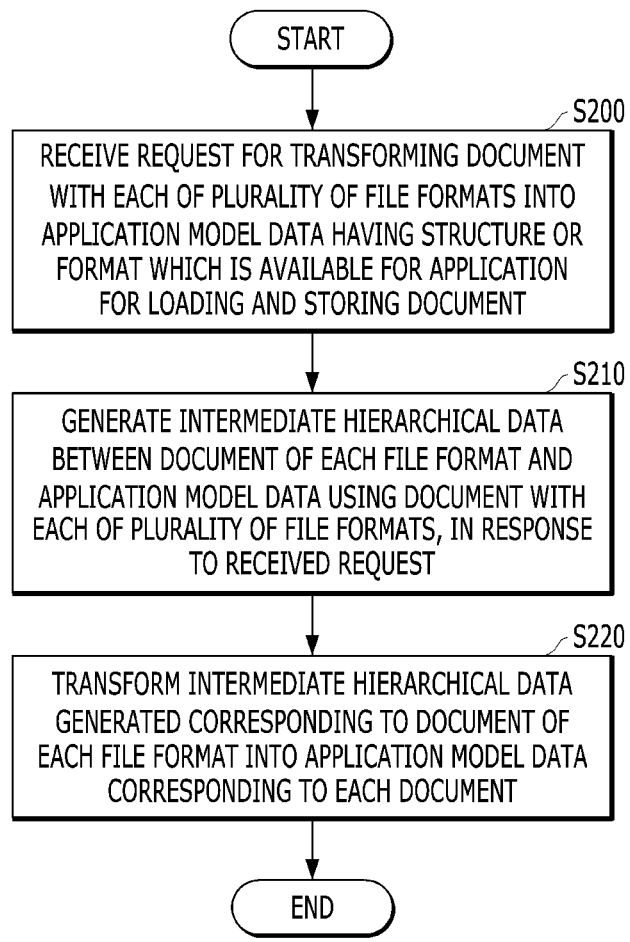
FIG. 2 is a flowchart of an exemplary method for transforming a document of each of plurality of file formats according to the exemplary embodiment of the present disclosure.

Hereinafter, a method for transforming a document with each of the plurality of file formats will be described in more detail with reference to FIGS. 2 to 7. FIG. 2 is a flowchart for explaining an example of a method for transforming a document with each of a plurality of file formats according to an exemplary embodiment of the present disclosure. In the proposed exemplary embodiment, operations of FIG. 2 are performed by a processor 140 of a computing device 100 or a control module of an application to be described below.

Referring to FIG. 2, the processor 140 receives a request for transforming a document with each of a plurality of file formats into application model data having a structure or a format which is available for an application for loading and storing the document (S200). For example, this request may be a document export request or a document import request.

The processor 140 generates intermediate hierarchical data between a document of each file format and application model data using the document with each of the plurality of file formats, in response to the received request (S210), which will be described below in more detail with reference to FIG. 3.

Figure 3:
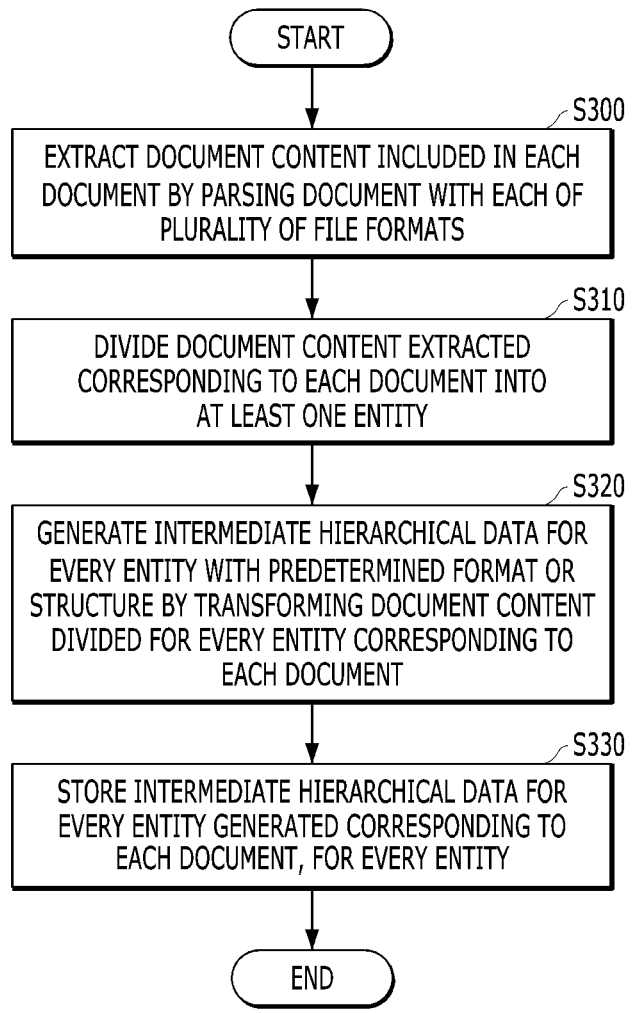
FIG. 3 is a flowchart of an exemplary method for generating intermediate hierarchical data corresponding to a document with each of file formats, using a document with each of plurality of file formats according to some exemplary embodiments of the present disclosure.

FIG. 3 is a flowchart for explaining an example of a method of generating intermediate hierarchical data corresponding to a document of each file format using the document with each of the plurality of file formats according to the exemplary embodiment of the present disclosure. In the proposed exemplary embodiment, operations of FIG. 3 are performed by a processor 140 of a computing device 100 or a control module of an application to be described below.

Referring to FIG. 3, the control unit 140 extracts a document content included in each document by parsing the document with each of the plurality of file formats (S300). For example, the document content is formed of a text formed by one or more phrases or paragraphs or may be formed of at least one of texts, figures, tables, formulas, or images.

The control unit 140 divides the document content extracted corresponding to each document into at least one entity (S310) and transforms the document contents which are divided for every entity corresponding to each document to generate the intermediate hierarchical data for every entity having a predetermined format or structure (S320). Specifically, the control unit 140 determines whether the document contents extracted corresponding to each document corresponds to at least one entity among the text, the figure, the table, the formula, or the image and divides the document content extracted corresponding to each document into at least one corresponding entity. For example, when the document content is formed by a text and a figure, the control unit 140 may divide the document content into a text and a figure. The control unit 140 may generate the intermediate hierarchical data for every entity in which a document content divided for every entity corresponding to each document is expressed with one same format or same structure. Each document is expressed with different formats or structures according to different file formats so that the document contents may be transformed to be expressed with one same format or structure.

The control unit 140 stores the intermediate hierarchical data for every entity generated corresponding to each document, for every entity (S330). A method for storing the intermediate hierarchical data for every entity generated corresponding to each document will be described in more detail with reference to FIG. 5.

Referring to FIG. 2 again, the control unit 140 transforms the intermediate hierarchical data generated so as to correspond to a document of each file format into application model data corresponding to each document (S220). Specifically, the control unit 140 generates application model data of a structure or a format which is available for the application using intermediate hierarchical data for every entity generated corresponding to a document of each file format. For example, the control unit 140 analyzes the intermediate hierarchical data for every entity to transform the intermediate hierarchical data into a document object of a language (for example, Java script) which is understandable in the application and generates application model data including at least one document object, attribute information of each document object and relational information representing a relationship between document objects. The control unit 140 stores the application model data generated corresponding to each document in the storage unit 130. When the application model data is stored, the control unit 140 may store the application model data so as to correspond to unique identification information of each document.

Hereinafter, a method for transforming a document with each of a plurality of file formats in an application of a computing device 100 will be described in more detail with reference to FIG. 4.

Figure 4:
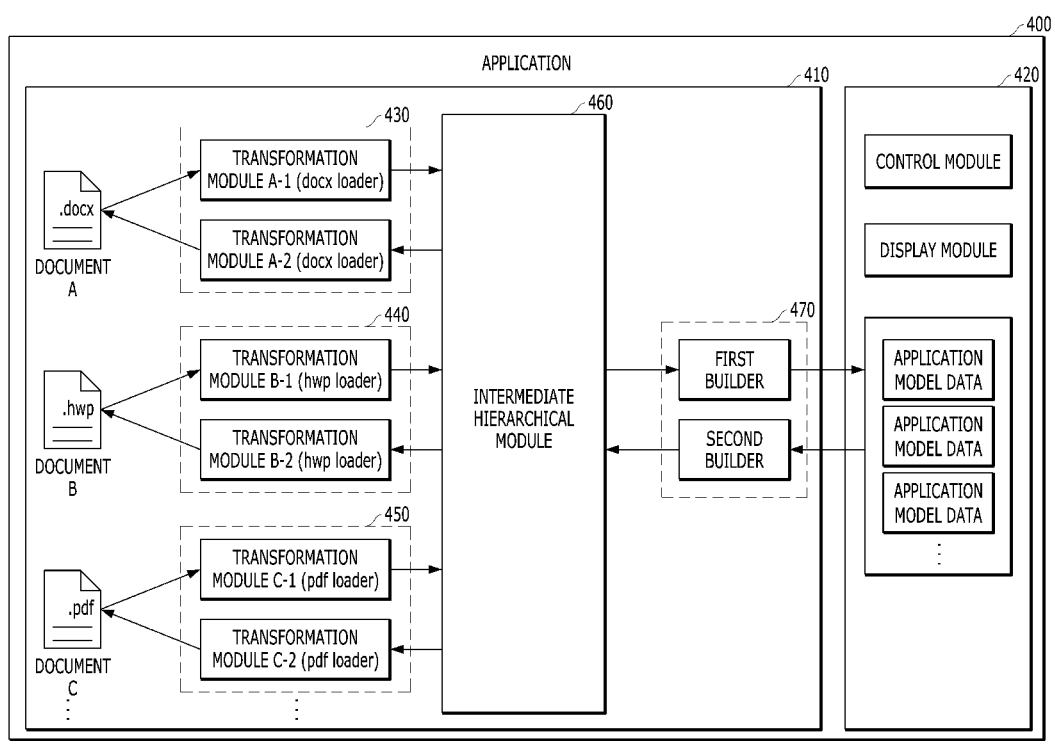
FIG. 4 is an exemplary diagram for describing an exemplary method for transforming a document with each of file formats in an application according to the exemplary embodiment of the present disclosure.

FIG. 4 is an exemplary view for explaining a method for transforming a document with each of a plurality of file formats in an application according to an exemplary embodiment of the present disclosure. In the proposed exemplary embodiment, the application 400 is software for loading and storing a document of various file formats in the computing device 100 and is stored in the storage unit 130 of the computing device 100. The control unit 140 of the computing device 100 may perform the document transformation method according to the exemplary embodiment of the present disclosure using each component of an application stored in the storage unit.

Referring to FIG. 4, the application 400 includes a first module 410 which performs a processing for loading and storing each of documents of various file formats and a second module 420 for storing a processed document. Here, the first module 410 may perform a document export/import function for loading and storing a document and the second module 420 may perform a function of storing application model data. The first module 410 may include transformation module sets 430, 440, and 450 for every file format for transforming between a document of each file format and the intermediate hierarchical data, an intermediate hierarchical module 460 which stores and manages intermediate hierarchical data generated corresponding to each file format, and a builder set 470 for transforming between the intermediate hierarchical data and application model data.

For example, the transformation module sets 430, 440, and 450 for every file format include a first transformation module set 430 for transforming between a document of a docx file format and intermediate hierarchical data, a second transformation module set 440 for transforming between a document of a hwp file format and intermediate hierarchical data, and a third transformation module set 450 for transforming between a document of a pdf file format and intermediate hierarchical data, but are not limited thereto and further include transformation module sets for transforming between documents of more various file formats and intermediate hierarchical data.

The first transformation module set 430 may include a transformation module A-1 for transforming a document A of a docx file format into intermediate hierarchical data and a transformation module A-2 for transforming the intermediate hierarchical data corresponding to the document A into a document A of a docx file format. For example, the transformation module A-1 is a docx loader for loading (or exporting) a docx document file and the transformation module A-2 is a docx writer for reading (or importing) the docx document file.

The second transformation module set 440 may include a transformation module B-1 for transforming a document B of a hwp file format into intermediate hierarchical data and a transformation module B-2 for transforming the intermediate hierarchical data corresponding to the document B into a document B of a hwp file format. For example, the transformation module B-1 is a hwp loader for loading a hwp document file and the transformation module B-2 is a hwp writer for reading the hwp document file.

The third transformation module set 450 may include a transformation module C-1 for transforming a document C of a pdf file format into intermediate hierarchical data and a transformation module C-2 for transforming the intermediate hierarchical data corresponding to the document C into a document C of a pdf file format. The transformation module C-1 is a pdf loader for loading a pdf document file and the transformation module C-2 is a pdf writer for reading the pdf document file.

In order to generate intermediate hierarchical data corresponding to the document A of the docx file format, the control unit 140 parses the document A of the docx file format using the transformation module A-1 to extract a document content included in the document A of the docx file format. For example, the document A may be formed only with a text. In this case, the document content means the corresponding text. In various exemplary embodiments, the document A is formed only with a text including pictures. In this case, the document content means a text including pictures.

The control unit 140 divides the extracted document content into at least one entity and transforms the document content which is divided into each entity corresponding to a document of each file format into intermediate hierarchical data having a predetermined format or structure. Here, at least one entity includes at least one of texts, figures, tables, formulae, or images, but is not limited thereto.

For example, when the document content is formed with a text, the control unit 140 transforms the corresponding text into intermediate hierarchical data corresponding to the text, which is expressed with the predetermined format or structure. In various exemplary embodiments, when the document content is formed with a text and a picture, the control unit 140 divides the document content into a text and an image and transforms the divided text and image into intermediate hierarchical data corresponding to the text and intermediate hierarchical data corresponding to the image, respectively, which are expressed with a predetermined format or structure.

The intermediate hierarchical module 460 includes a container for every entity to store intermediate hierarchical data generated corresponding to a document of each file format. Here, the container for every entity includes at least one of a first container for storing intermediate hierarchical data corresponding to a text so as to correspond to a document of each file format, a second container for storing intermediate hierarchical data corresponding to a figure so as to correspond to a document of each file format, a third container for storing intermediate hierarchical data corresponding to a table so as to correspond to a document of each file format, a fourth container for storing intermediate hierarchical data corresponding to a formula so as to correspond to a document of each file format, or a fifth container for storing intermediate hierarchical data corresponding to an image so as to correspond to a document of each file format, but is not limited thereto.

For example, it is assumed that in response to the document A, there are first intermediate hierarchical data corresponding to a text and second intermediate hierarchical data corresponding to an image and in response to the document B, there are third intermediate hierarchical data corresponding to an image and fourth intermediate hierarchical data corresponding to a table. In this case, the control unit 140 may store the first intermediate hierarchical data of the document A in the first container of the intermediate hierarchical module 360 and store the second intermediate hierarchical data of the document A in the fifth container of the intermediate hierarchical module 360. Further, the control unit 140 may store the third intermediate hierarchical data of the document B in the fifth container of the intermediate hierarchical module 360 and store the fourth intermediate hierarchical data of the document B in the third container of the intermediate hierarchical module 360.

The builder set 470 includes a first builder and a second builder and the first builder is a module for transforming intermediate hierarchical data into application model data and the second builder is a module for transforming application model data into intermediate hierarchical data.

The control unit 140 transforms the intermediate hierarchical data generated corresponding to each document to generate application model data corresponding to each document, using the first builder. The control unit 140 stores the application model data generated corresponding to each document in the second module 420. In various exemplary embodiments, the control unit 140 may transform the application model data stored corresponding to each document into intermediate hierarchical data, using the second builder.

The second module 420 may include a storage module 480 which stores the application model data for every document in a data structure format. For example, the storage module 480 stores unique identification information for each document and application model data generated so as to correspond to each document.

In various exemplary embodiments, the second module 420 may further include a control module for controlling an overall operation of the application 400 and a display module for displaying or outputting application model data.

Hereinafter, a method for transforming and storing documents of different file formats into application model data of a structure or a format which is available for the application will be described with reference to FIGS. 5A and 5B.

Figure 5A:
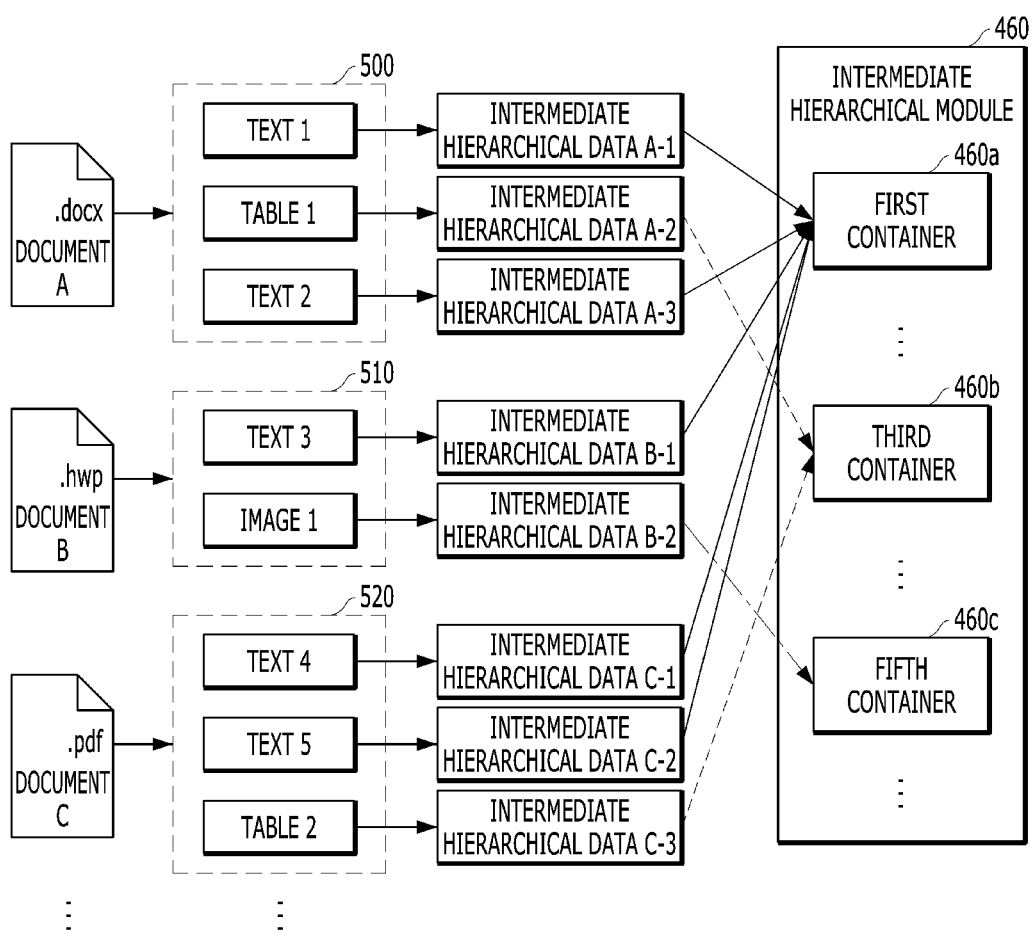
FIGS. 5a and 5b are exemplary diagrams for describing an exemplary method for transforming and storing documents with different formats into application model data with a format or a structure which is available in an application according to some exemplary embodiments of the present disclosure.
Figure 5B:
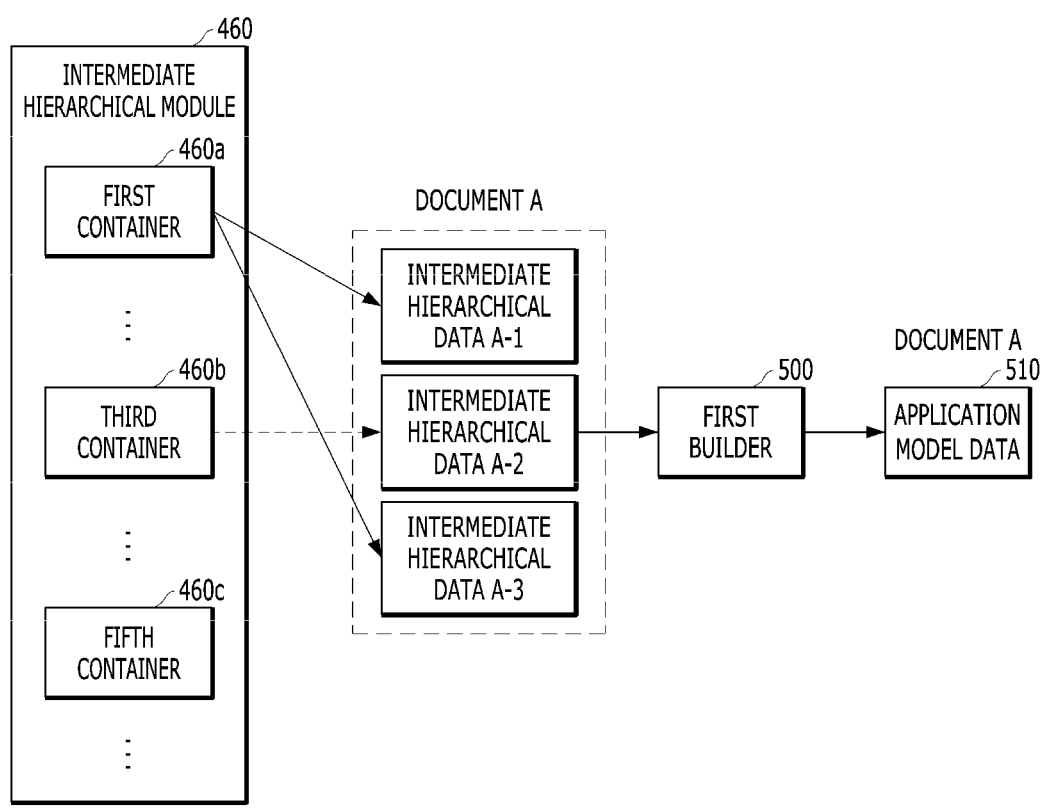

FIGS. 5A and 5B are exemplary views for explaining a method for transforming and storing documents of different file formats into application model data of a structure or a format which is available for the application, according to an exemplary embodiment of the present disclosure. In the proposed exemplary embodiment, a document export operation in an application will be explained.

Referring to FIG. 5A, a document A of a docx file format includes a first document content 500 configured by text 1, table 1, and text 2, a document B of a hwp file format includes a second document content 510 configured by text 3 and image 1, and a document C of a pdf file format includes a third document content 520 configured by text 4, text 5, and table 2.

The control unit 140 extracts a first document content 500 from a document A using the transformation module A-1 described in FIG. 4 and divides the extracted first document content 500 for every entity to generate intermediate hierarchical data for every entity corresponding to the document A. For example, the intermediate hierarchical data for every entity generated corresponding to the document A includes intermediate hierarchical data A-1 corresponding to a text, intermediate hierarchical data A-2 corresponding to a table, and intermediate hierarchical data A-3 corresponding to a text.

Next, the control unit 140 extracts a second document content 510 from a document B using the transformation module B-1 described in FIG. 4 and divides the extracted second document content 510 for every entity to generate intermediate hierarchical data for every entity corresponding to the document B. For example, the intermediate hierarchical data for every entity generated corresponding to the document B includes intermediate hierarchical data B-1 corresponding to a text and intermediate hierarchical data B-2 corresponding to an image.

Next, the control unit 140 extracts a third document content 520 from a document C using the transformation module C-1 described in FIG. 4 and divides the extracted third document content 520 for every entity to generate intermediate hierarchical data for every entity corresponding to the document C. For example, the intermediate hierarchical data for every entity generated corresponding to the document C includes intermediate hierarchical data C-1 corresponding to a text, intermediate hierarchical data C-2 corresponding to a text, and intermediate hierarchical data C-3 corresponding to a table.

The control unit 140 may store the intermediate hierarchical data for every entity generated corresponding to the document A, the intermediate hierarchical data for every entity generated corresponding to the document B, and the intermediate hierarchical data for every entity generated corresponding to the document C in a container for every entity of the intermediate hierarchical module 460.

Specifically, the control unit 140 stores the intermediate hierarchical data A-1 and intermediate hierarchical data A-3 corresponding to a text, among the intermediate hierarchical data for every entity generated corresponding to the document A in the first container 460a which stores intermediate hierarchical data corresponding to a text in the intermediate hierarchical module 460 and stores the intermediate hierarchical data A-2 corresponding to a table in a third container 460b which stores the intermediate hierarchical data corresponding to a table in the intermediate hierarchical module 460.

Next, the control unit 140 stores the intermediate hierarchical data B-1 corresponding to a text, among the intermediate hierarchical data for every entity generated corresponding to the document B in the first container 460*a* and stores the intermediate hierarchical data B-2 corresponding to an image in a fifth container 460*c* which stores the intermediate hierarchical data corresponding to an image in the intermediate hierarchical module 460.

Next, the control unit 140 stores the intermediate hierarchical data C-1 and the intermediate hierarchical data C-2 corresponding to the text, among the intermediate hierarchical data for every entity, generated corresponding to the document C in the first container 460*a* and stores intermediate hierarchical data C-3 corresponding to the table in the third container 460*b*.

Referring to FIG. 5B, the control unit 140 may generate application model data 510 corresponding to the document A using intermediate hierarchical data A-1, A-2, and A-3 stored in each container (that is, the first container 460*a* and the third container 460*b*) corresponding to the document A, using the first builder 500. Specifically, the control unit 140 transforms each of intermediate hierarchical data A-1, A-2, and A-3 into a document object of a language which is understandable in the application and generates application model data 510 including a set of document objects, attribute information of each document object, and relational information representing a relationship between the document objects.

Even though it is not illustrated in the drawing, in various exemplary embodiments, the control unit 140 may generate application model data, as described above for the document B and the document C. With regard to this, specifically, the control unit 140 may generate application model data corresponding to the document B using intermediate hierarchical data B-1 and B-2 stored in each container (that is, the first container 460*a* and the fifth container 460*c*) corresponding to the document B using the first builder 500. Specifically, the control unit 140 transforms each of intermediate hierarchical data B-1 and B-2 into a document object of a language which is understandable in the application and generates application model data including a set of document objects, attribute information of each document object, and relational information representing a relationship between the document objects.

The control unit 140 may generate application model data corresponding to the document C using intermediate hierarchical data C-1, C-2, and C-3 stored in each container (that is, the first container 460*a* and the third container 460*b*) corresponding to the document C using the first builder 500. Specifically, the control unit 140 transforms each of intermediate hierarchical data C-1, C-2, and C-3 into a document object of a language which is understandable in the application and generates application model data including a set of document objects, attribute information of each document object, and relational information representing a relationship between the document objects.

The control unit 140 may store the application model data generated as described above using a data structure method. Specifically, the control unit 140 stores unique identification information of the document A and the application model data generated corresponding to the document A so as to correspond to each other, stores unique identification information of the document B and the application model data generated corresponding to the document B so as to correspond to each other, and stores unique identification information of the document C and the application model data generated corresponding to the document C so as to correspond to each other.

Hereinafter, a method for transforming application model data with a structure or a format which is available for the application into documents of different file formats will be described with reference to FIGS. 6A and 6B.

Figure 6A:
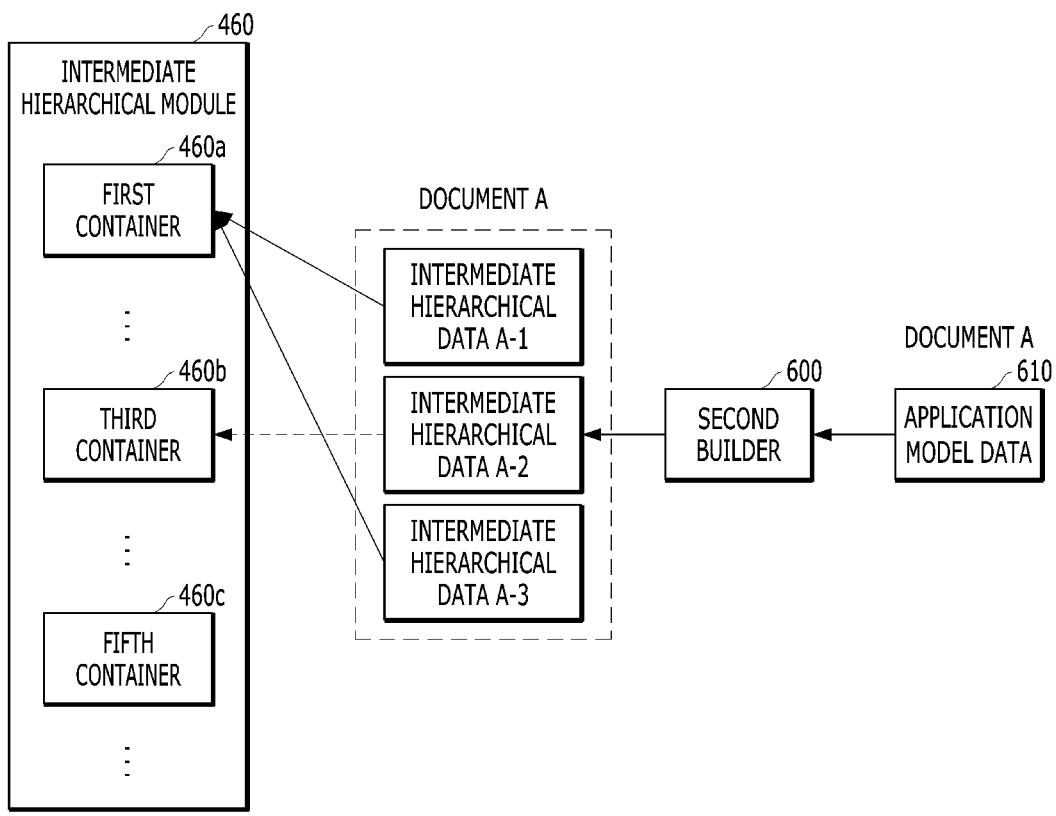
FIGS. 6a and 6b are exemplary diagrams for describing an exemplary method for transforming application model data with a format or a structure which is available in an application into documents with different formats according to an exemplary embodiment of the present disclosure.
Figure 6B:
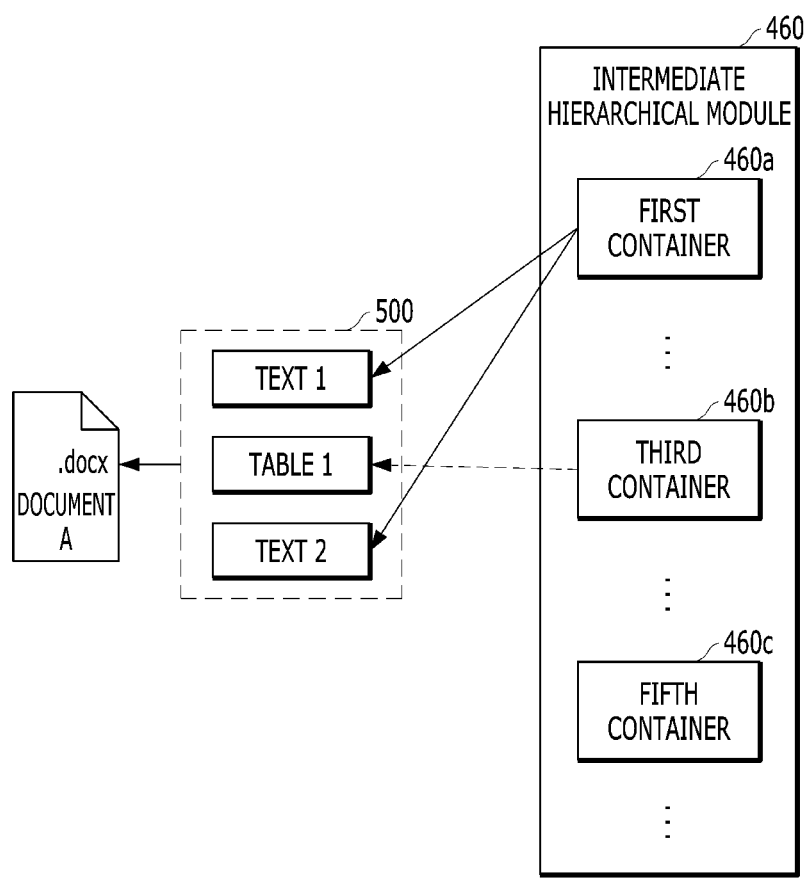

FIGS. 6A and 6B are exemplary views for explaining a method for transforming application model data with a structure or a format which is available for the application into documents of different file formats, according to an exemplary embodiment of the present disclosure. In the proposed exemplary embodiment, an import operation for a document A in the application will be described.

Referring to FIG. 6A, the control unit 140 transforms the application model data 610 which is stored corresponding to the document A into intermediate hierarchical data for every entity corresponding to the document A, using the second builder 600. Specifically, the control unit 140 generates intermediate hierarchical data A-1, A-2, and A-3 corresponding to the document A, using at least one document object, attribute information of each document object, and relational information, included in the application model data 610.

The control unit 140 stores the generated intermediate hierarchical data A-1, A-2, and A-3 in the intermediate hierarchical module 460. Specifically, the control unit 140 stores the intermediate hierarchical data A-1 and the intermediate hierarchical data A-3 in the first container 460*a* and stores the intermediate hierarchical data A-2 in the third container 460*b*.

Referring to FIG. 6B, the control unit 140 transforms the intermediate hierarchical data for every entity corresponding to the document A into the document A using a transformation module corresponding to the file format of the document A. Specifically, referring to FIG. 4, the control unit 140 transforms the intermediate hierarchical data for every entity into a document content including a text 1, a table 1, and a text 2 using the transformation module A-2 corresponding to a docx file format and generates a document A of a docx file format including the document contents.

Hereinafter, an operation of loading (that is, importing) a document when application model data is modified, according to some exemplary embodiments of the present disclosure, will be described.

Figure 7:
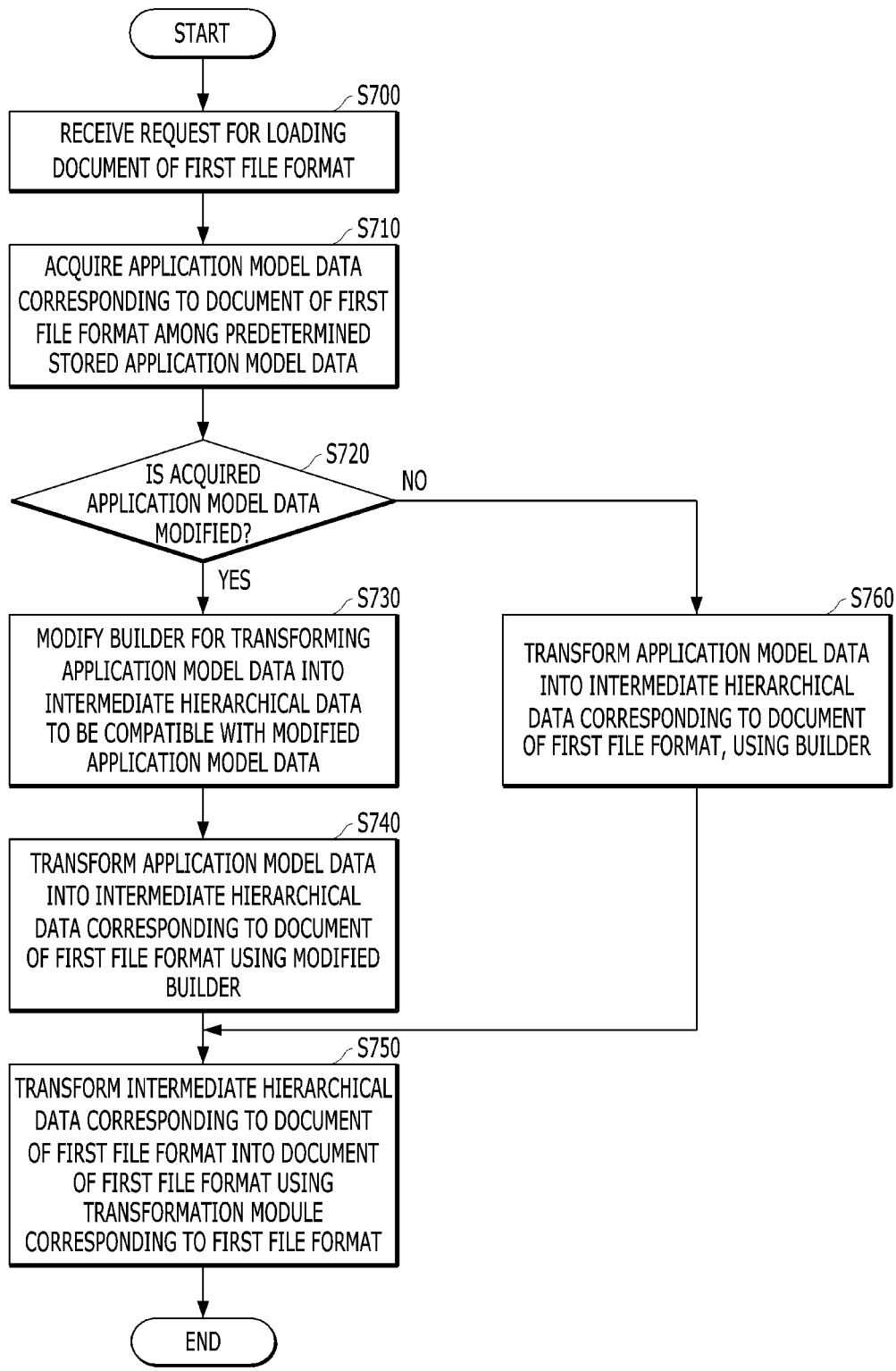
FIG. 7 is a flowchart for describing an example of a document loading method when application model data is modified according to an exemplary embodiment of the present disclosure.

FIG. 7 is a flowchart for explaining an example of a document loading method when application model data according to some exemplary embodiments of the present disclosure is modified.

Referring to FIG. 7, the control unit 140 receives a request for loading a first document of a first file format (S700) and acquires an application model corresponding to the first document among application model data which has been stored in advance (S710). Here, the received request includes unique identification information of the first document and the control unit 140 acquires an application model corresponding to the first document, among application model data which has been stored in advance, using the unique identification information of the first document.

The control unit 140 determines whether the acquired application model data is modified (S720) and when the acquired application model data is modified, modifies a builder for transforming the application model data into intermediate hierarchical data to be compatible with the modified application model data (S730). For example, the control unit 140 may modify the first builder 500 and the second builder 600 which have been described above with reference to FIGS. 5B and 6B, based on the modified application model data.

The control unit 140 transforms the application model data into intermediate hierarchical data corresponding to a document of a first file format, using the modified builder (S740) and transforms the intermediate hierarchical data corresponding to the document of the first file format into a document of the first file format using the transformation module corresponding to the first file format (S750). For example, the control unit 140 transforms the intermediate hierarchical data into a document of each file format using the transformation modules A-2, B-2, or C-2 which has been described above with reference to FIG. 4.

If the acquired application model data is not modified, the control unit 140 transforms the application model data into intermediate hierarchical data corresponding to the document of the first file format using the builder (S760) and performs the operation of S750.

As described above, according to the present disclosure, even though the application model data is modified, only builders are modified without modifying all the transformation modules to be compatible with the application model data so that the inconvenience of modifying all the implemented modules is reduced and resources consumed for the modification may be minimized.

Figure 8:
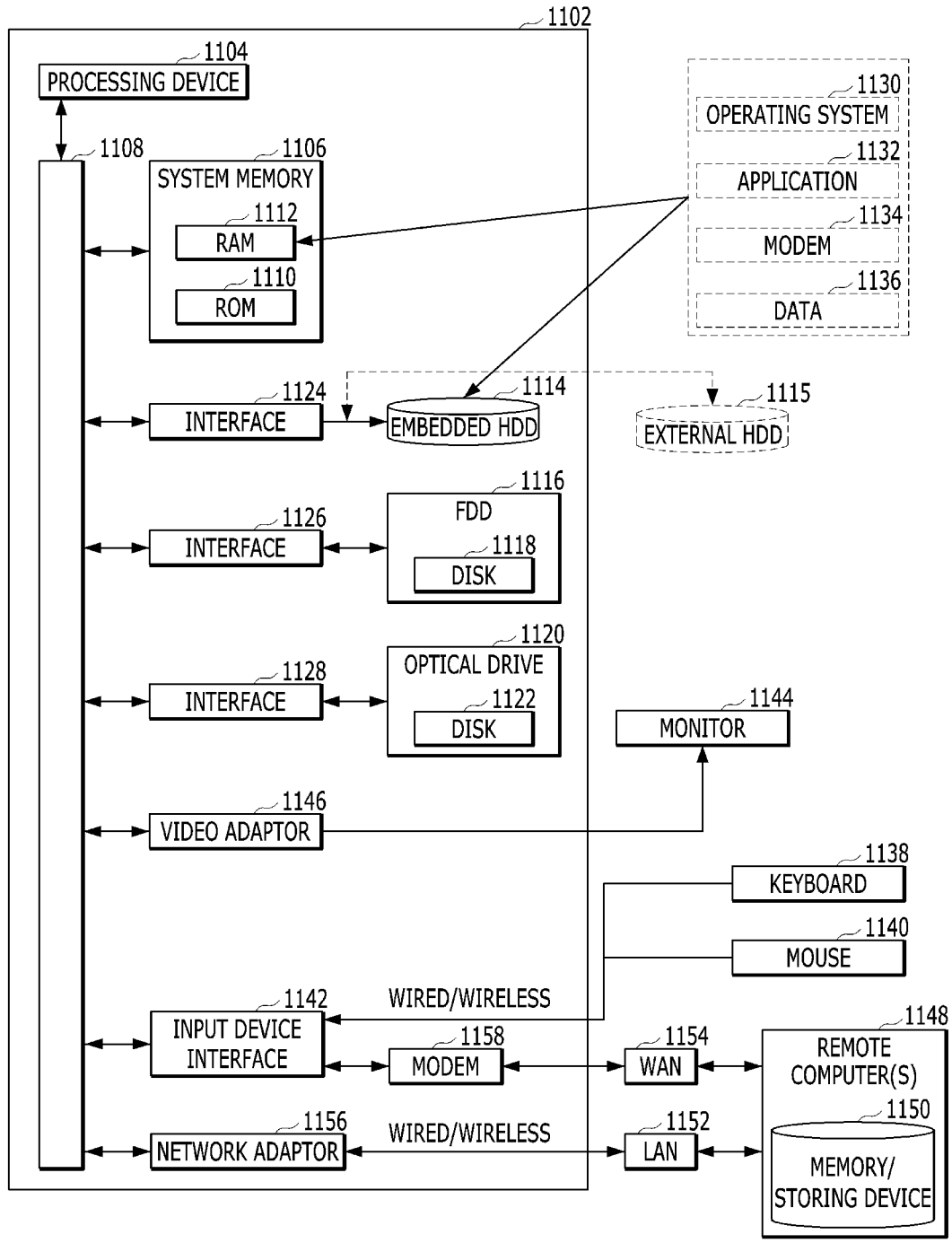
FIG. 8 is a simple and general schematic diagram illustrating an example of a computing environment in which the embodiments of the present disclosure are implementable.

FIG. 8 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a minicomputer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB)

and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

The invention claimed is:

1. A document transforming method for transforming a document with each of a plurality of file formats, performed by a computing device, comprising:
receiving a request for transforming a document with each of the plurality file formats into application model data having a structure or format which is available for an application for loading and storing the document;
generating intermediate hierarchical data between the document with each of the plurality of file formats and the application model data, using the document with each of the plurality of file formats, in response to the received request;
transforming intermediate hierarchical data generated corresponding to each of the plurality of file formats into application model data corresponding to each of the plurality of file formats;
wherein unique identification information for the document with each of the plurality of file formats and the application model data generated corresponding to the document with each of the plurality of file formats are stored in a data structure, so as to correspond to each other.

2. The document transforming method according to claim 1, wherein the generating of the intermediate hierarchical data, using the document with each of the plurality of file formats is transforming the document into intermediate hierarchical data corresponding to each document, using a transformation module corresponding to each of the plurality of file formats and
wherein the transformation module corresponding to each of the plurality of file formats is a module for transforming the document with each of the plurality of file formats into intermediate hierarchical data corresponding to each document.

3. The document transforming method according to claim 2, wherein the transforming of the document into intermediate hierarchical data corresponding to each document, using a transformation module corresponding to each of the plurality of file formats includes:
extracting a document content included in each document by parsing the document with each of the plurality of file formats;
dividing the document content extracted corresponding to each document into at least one entity;
generating intermediate hierarchical data for every entity having a predetermined format or structure by transforming the document content which is divided for every entity corresponding to each document; and
storing the intermediate hierarchical data for every entity generated corresponding to each document, for every entity.

4. The document transforming method according to claim 3, wherein at least one entity includes at least one of a text, a figure, a table, a formula, or an image.

5. The document transforming method according to claim 3, wherein the transforming of the document content into intermediate hierarchical data which is divided for every entity corresponding to each document with each of the plurality of file formats is transforming the document content for every entity having different expression formats for every file format into intermediate hierarchical data for every entity having one same expression format.

6. The document transforming method according to claim 3, further comprising:
storing the intermediate hierarchical data for every entity corresponding to each document in an intermediate hierarchical module including a container for every entity corresponding to each of at least one entity.

7. The document transforming method according to claim 1, wherein the transforming of intermediate hierarchical data generated corresponding to each of the plurality of file formats into application model data corresponding to each of the plurality of file formats is transforming the intermediate hierarchical data into application model data using a first builder for transforming the intermediate hierarchical data into the application model data.

8. The document transforming method according to claim 7, wherein the transforming of the intermediate hierarchical data into application model data using the builder includes:
transforming the intermediate hierarchical data into at least one document object formed by a language understandable in the application by analyzing the intermediate hierarchical data for every entity; and
generating the application model data including at least one document object, attribute information of each document object, and relational information representing a relationship between document objects.

9. The document transforming method according to claim 7, further comprising:
receiving a request for loading a document of a first file format;
acquiring application model data corresponding to the document of the first file format, among previously stored document model data;
determining whether the acquired application model data is modified;

modifying a second builder for transforming the application model data into intermediate hierarchical data corresponding to the document of the first file format to be compatible with the acquired application model data when the acquired application model data is modified;

transforming the acquired application model data into intermediate hierarchical data corresponding to a document of the first file format, using the modified second builder; and transforming the intermediate hierarchical data corresponding to the document of the first file format into the document of the first file format.

10. The document transforming method according to claim 9, wherein the transforming of the intermediate hierarchical data corresponding to the document of the first file format into the first document is transforming the intermediate hierarchical data corresponding to the document of the first file format into the document of the first file format using a transformation module corresponding to the first file format, and wherein the transformation module corresponding to the first file format is a module for transforming the intermediate hierarchical data corresponding to the document of the first file format into the document of the first file format.

11. The document transforming method according to claim 9, further comprising:

transforming the acquired application model data into intermediate hierarchical data corresponding to the document of the first file format using the second builder when the acquired application model data is not modified; and transforming the intermediate hierarchical data corresponding to the document of the first file format into the document of the first file format.

12. A non-transitory computer readable storage medium comprising a computer program, wherein when the computer program is executed by one or more processors to perform the following operations to transform a document with each of a plurality of file formats, the operations comprising:

receiving a request for transforming a document with each of the plurality file formats into application model data having a structure or format which is available for an application for loading and storing the document;

generating intermediate hierarchical data between the document with each of the plurality of file formats and the application model data, using the document with each of the plurality of file formats, in response to the received request;

transforming intermediate hierarchical data generated corresponding to each of the plurality of file formats into application model data corresponding to each of the plurality of file formats;

wherein unique identification information for the document with each of the plurality of file formats and the application model data generated corresponding to the document with each of the plurality of file formats are stored in a data structure, so as to correspond to each other.

13. A computing device for transforming a document with each of a plurality of file formats, comprising:

at least one processor; and a memory, wherein the at least one processor is configured to:

receive a request for transforming a document with each of the plurality file formats into application model data having a structure or format which is available for an application for loading and storing the document, generate intermediate hierarchical data between the document with each of the plurality of file formats and the application model data, using the document with each of the plurality of file formats, in response to the received request, transform intermediate hierarchical data generated corresponding to each of the plurality of file formats into application model data corresponding to each of the plurality of file formats, wherein unique identification information for the document with each of the plurality of file formats and the application model data generated corresponding to the document with each of the plurality of file formats are stored in a data structure, so as to correspond to each other.

\* \* \* \* \*